O. COON.
CEMENT BLOCK MACHINE.
APPLICATION FILED JULY 11, 1907.
915,556.  Patented Mar. 16, 1909.
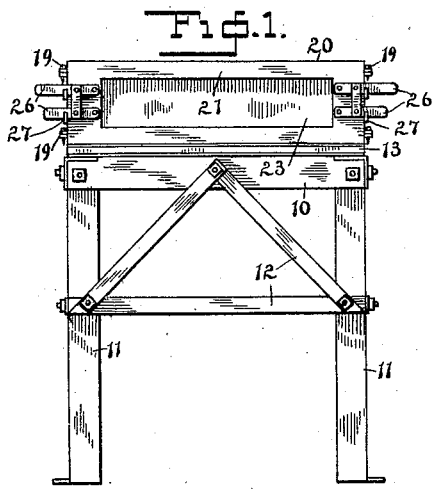
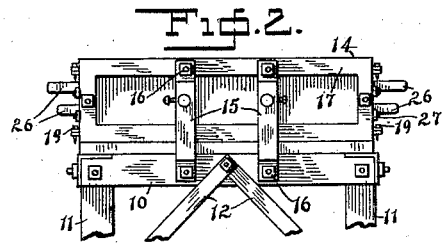
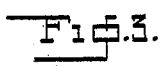
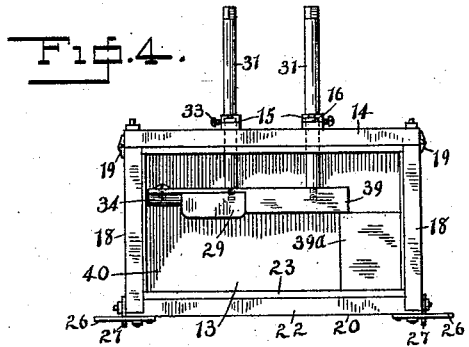
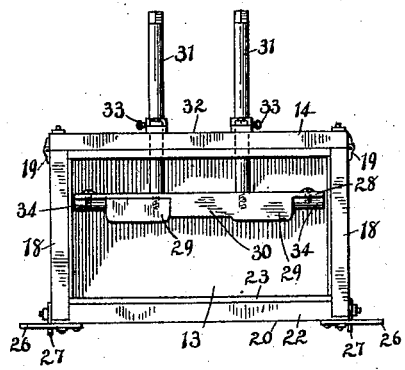
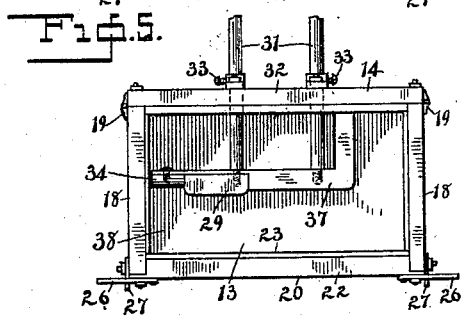
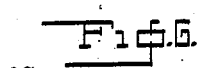
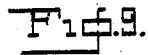
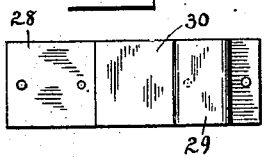
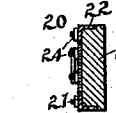
WITNESSES:
Mathiew J. Marty
Chas. F. Bassett
INVENTOR
Oscar Coon
By Frederick Benjamin
ATTY.

UNITED STATES PATENT OFFICE.

OSCAR COON, OF CHICAGO, ILLINOIS.

CEMENT-BLOCK MACHINE.

No. 915,556.   Specification of Letters Patent.   Patented March 16, 1909.

Application filed July 11, 1907. Serial No. 383,184.

*To all whom it may concern:*

Be it known that I, OSCAR COON, a citizen of the United States, residing at Chicago, in the county of Cook and State of Illinois, have invented certain new and useful Improvements in Cement-Block Machines, of which the following is a specification.

My invention relates to the art of manufacturing artificial stone and has especial reference to apparatus for molding concrete blocks for building purposes; the particular class in which the device is included being commonly referred to as molds for producing two piece blocks.

The paramount objects of my invention are to produce a molding machine for concrete material that will be simple in its construction convenient to operate, and of such a design that the changes necessary to produce blocks of various sizes and configuration can be quickly and easily made.

Further objects of my improved cement block mold are to furnish means for readily removing the flask from the finished product so that the latter can be carried away upon the pallet board and allowed to remain thereon until the curing or setting process is complete.

Other objects of my improvement are to provide a molding machine for the purpose stated that will be economical to manufacture, and having a wide range of application only one machine with accessories will be needed for producing all the various forms of blocks required in a building, and as the face plate is removable, a great variety of facings may be produced by substituting different designs.

I accomplish the above and other objects of less importance by the use of the machine illustrated in the accompanying drawing which forms a part of this specification and in which:

Figure 1 is a front elevation of my improved cement block machine; Fig. 2 is a rear elevational view a portion of the table supports being broken away; Fig. 3 is a plan view of the flask with follower for producing course blocks; Fig. 4 is a plan view of the flask with the follower used for molding inside corner blocks; Fig. 5 is a plan view of the mold with the follower employed in making outside corner blocks; Fig. 6 is a front view of the follower shown in Fig. 3 with cores detached; Fig. 7 is a perspective view of one of the end cores; Fig. 8 is a perspective view of one of the vertical core blocks; Fig. 9 is a cross section through the front gate and face plate.

Referring to the drawing in detail, the numeral 10 indicates a rectangular frame supported on legs 11 strengthened by braces 12 being composed of angle iron and forming a rigid and substantial stand or table upon which rests the mold or flask proper. The angled members comprising the said frame 10 are so fitted together that their upper surfaces are flush with each other and thus form a smooth plane upon which is placed a pallet board 13. The flask is formed of four members, preferably cast in frame form the open portion being closed with a removable plate. The rear side 14 of the flask is secured to the table frame by means of blocks 15, vertically disposed and secured by bolts 16 to the side frame 17 and the table 10. To the rear side 14 are hinged end gates 18 the pintles 19 of the hinges being removable to facilitate dismantling. The front member 20 of the flask is cast in the form of a frame 21, having flanges 22 above and below which engage the margins of a face plate 23, removably secured to the frame by bolts 24. The frame 21 of said front member is provided with a double latch 26 at each end which engage catches 27 formed integral with the free ends of the end gates 18. When the said front member is in position and secured by the interlocking of the said latches 26 with their catches, the sides of the flask form a four sided mold box firmly secured to the table and resting upon the pallet board.

For the purpose of varying the size of the block I provide a follower 28 upon which are carried imprint blocks or cores 29, 30, for producing the desired recesses in the molded product. The follower is furnished with adjusting rods 31 which pass through holes in the retaining blocks 15 and the frame plate 32, and are threaded for engagement with the follower. One of said core blocks 29 is removable and is held in place by its adjusting rod, the screw end of which engages a threaded hole in said core. The distal ends of said rods are squared to afford a hold for a wrench when the rods are removed or inserted.

In order to hold the follower securely in the desired location when adjusted set screws 33 are inserted in the retaining blocks 15. The impress of the core blocks 29, 30 are for the purpose of producing vertical flues or passages when the blocks are assembled in the walls and as it is desirable to form horizontal communicating openings between such passages, the follower is furnished at each end with horizontal core blocks 34 removably secured to the face of the said follower by suitable screws, which engage threaded holes 35 therein. The follower 28 illustrated in Fig. 3 is designed for producing a course block of standard dimension that cell of the flask designated by 36 being the portion utilized.

For outside corner blocks the follower 37 shown in Fig. 5 is employed the cavity 38 forming the mold; and for inside corner blocks the follower 39 seen in Fig. 4 is utilized. It will be understood that the different follower plates and their cores may be made integral but I prefer for the sake of economy to make the end cores 34 and one of the blocks 29 removable, as aforesaid, in order to complete the various forms required.

The method of using my machine is as follows: The follower 28 having been adjusted for the particular size and form of block desired, and the set screws 33 tightened the material previously mixed in proper proportions is placed in the mold and tamped firmly in the usual manner. To remove the finished block the latches of the face plate frame are lifted and said plate and frame taken away. The end gates are then swung on their hinges away from the block leaving the molded piece resting upon the pallet board. The latter can then be set aside with the piece resting thereon undisturbed until sufficiently set to permit of its being handled. To mold the succeeding blocks a fresh pallet board is placed in position and the various members of the flask replaced to form a mold for a new block. When a sufficient number of course blocks are formed the follower 28 is removed and in its place is secured the follower 37 when it is desired to produce corner blocks for the outside courses. To change the mold so as to produce suitable inside blocks the follower 39 replaces the one previously used and a filler 39ª is employed to give the finished piece its required dimension, the cell 40 thus formed being the portion in which the prepared cement is placed and tamped.

It is obvious that various changes may be made in the details of construction of my appliance as herein disclosed without departing from the spirit and scope thereof and I do not wish, therefore to be limited to the precise construction set forth.

Having thus described my invention what I claim is:—

In a mold-box, comprising a back member, end members hinged to said back, and a front member detachably connected to said end members, a follower adjustably arranged in said box, core blocks detachably secured to said follower, adjusting rods passing through the back member and adapted to secure said core blocks to the follower, and means on said back member for locking said rods in position.

In testimony whereof I affix my signature in the presence of two witnesses.

OSCAR COON.

Witnesses:
F. BENJAMIN,
WM. B. MOORE.